United States Patent [19]

Rau

[11] 4,361,527

[45] Nov. 30, 1982

[54] METHOD OF FORMING STRETCHED ACRYLIC SHEETS

[75] Inventor: Robert B. Rau, Canyon Country, Calif.

[73] Assignee: PPG Industries, Inc., Pittsburgh, Pa.

[21] Appl. No.: 313,450

[22] Filed: Oct. 21, 1981

[51] Int. Cl.$^3$ ........................ B29D 7/22; B29C 17/12
[52] U.S. Cl. ..................................... 264/25; 264/2.7; 264/162; 264/235; 264/291; 264/292; 264/293; 264/322; 264/346
[58] Field of Search .................. 264/1.4, 2.7, 25, 230, 264/162, 235, 291, 292, 293, 322, 346

[56] References Cited

U.S. PATENT DOCUMENTS

| | | | |
|---|---|---|---|
| Re. 24,978 | 5/1961 | Bottoms et al. | 18/1 |
| 2,897,546 | 8/1959 | Clapp et al. | 264/346 |
| 3,000,057 | 9/1961 | Swedlow et al. | 264/2.7 |
| 3,562,383 | 2/1971 | Ayres | 264/296 |
| 3,632,841 | 1/1972 | Fortin | 264/1 |
| 3,668,053 | 6/1972 | Ayres | 161/118 |
| 3,784,655 | 1/1974 | Lewchuck et al. | 264/1 |
| 3,808,077 | 4/1974 | Rieser et al. | 156/102 |
| 3,937,863 | 2/1976 | Moore | 428/410 |
| 4,078,107 | 3/1978 | Bitterice et al. | 428/38 |
| 4,231,827 | 11/1980 | Wilson et al. | 156/214 |

Primary Examiner—James B. Lowe
Attorney, Agent, or Firm—Donald Carl Lepiane; Lee Patch

[57] ABSTRACT

A stretched acrylic sheet which is to be formed into a vision panel at an elevated temperature has its major surfaces reheated to an elevated temperature to intentionally generate a class of surface formations thereon for subsequent removal by polishing prior to the formation of the final vision panel. Such surface deformations are otherwise undesirably generated during vision panel formation and detract from the optical quality of the final product.

8 Claims, 1 Drawing Figure

Operational Steps

Step 1) Preheat Billet of Acrylic Material to a stretching temperature.

Step 2) Apply stretching forces to the Billet of Acrylic Material while maintaining it at the stretching temperature.

Step 3) Controllably Cooling the stretched acrylic sheet to below its softening temperature before relaxing the stretching forces.

Step 4) Heat major surfaces of the stretched acrylic sheet to an elevated temperature to generate additional surface deformations.

Step 5) Cool the stretched acrylic sheet.

Step 6) Polish the major surfaces of the stretched acrylic sheet to remove surface deformations.

Step 7) Form a vision panel from the stretched acrylic sheet at an elevated temperature.

Operational Steps

Step 1) Preheat Billet of Acrylic Material to a stretching temperature.

Step 2) Apply stretching forces to the Billet of Acrylic Material while maintaining it at the stretching temperature.

Step 3) Controllably Cooling the stretched acrylic sheet to below its softening temperature before relaxing the stretching forces.

Step 4) Heat major surfaces of the stretched acrylic sheet to an elevated temperature to generate additional surface deformations.

Step 5) Cool the stretched acrylic sheet.

Step 6) Polish the major surfaces of the stretched acrylic sheet to remove surface deformations.

Step 7) Form a vision panel from the stretched acrylic sheet at an elevated temperature.

METHOD OF FORMING STRETCHED ACRYLIC SHEETS

FIELD OF THE INVENTION

This invention relates to light weight vision panels including a stretched acrylic sheet, and more particularly, to a method of forming the stretched acrylic sheets.

Discussion of the Technical Problem

It is known in the production of light-weight transparencies to utilize stretched acrylic sheets, either monolithically or as a portion of a laminate structure. Generally, such acrylic sheets are stretched from a blank of acrylic material to a desired thickness, in order to improve the physical characteristics of the acrylic part. Stretching is generally accomplished by either a pulling technique such as taught in U.S. Pat. No. Re. 24,978 to Bottoms et al., or by a pressing technique such as taught in U.S. Pat. No. 3,632,841 to Fortin. In both techniques an acrylic blank is preheated to above a softening temperature, stretched, and thereafter controllably cooled to below the softening temperature before the stretching forces are relaxed, in order to avoid the affects of "plastic memory", i.e., internal forces which tend to return the acrylic to its original configuration. After the stretched acrylic sheet is cooled, it is ground and/or polished to remove surface deformations therefrom to provide a desired optical smoothness, and then the sheet is incorporated into a vision panel, e.g., an aircraft transparency.

During its incorporation into a vision panel, e.g., during shaping and/or lamination to other substrates, the optically smooth stretched acrylic sheet is commonly subjected to elevated temperatures. It has been determined that the optically smooth major surfaces of the stretched acrylic sheet may be detrimentally affected by such a subsequent elevated temperature condition, leading to optically undesirable surface deformations in the final vision panel which makes it unacceptable for use. It would be desirable to have a method of forming stretched acrylic sheets which diminished or eliminated this limitation in the present technique.

SUMMARY OF THE INVENTION

The present invention provides a method of forming stretched acrylic sheets which diminishes or eliminates the generation of additional surface deformations on the major surfaces of a stretched acrylic sheet during its incorporation into a vision panel at elevated temperatures. It is believed that additional deformations are generated by the elevated temperature conditions required in the formation of the final vision panel, due to a relaxation of surface stresses in the surface portions of the stretched acrylic sheet. The improvement of the present invention includes the additional steps of, after practicing the controlled cooling step and before practicing the surface polishing step discussed above, heating at least the major surfaces of the stretched acrylic sheet to a temperature sufficient to initiate the generation of the additional surface deformations; and, recooling the stretched acrylic sheet to below its softening temperature. In this manner, the additional surface deformations believed to be caused by surface stress relaxation may be removed by a polishing step prior to the formation of the final vision panel, in order that an elevated temperature condition during the formation of the vision panel will not tend to generate any new surface deformations. Preferably, the reheating step is practiced to substantially localize the heat to major surfaces of the stretched acrylic sheet to relax only surface stresses, and is more preferably practiced with radiant heating means to provide a surface temperature on the stretched acrylic sheet which exceeds the elevated temperatures expected during subsequent vision panel formation.

DESCRIPTION OF THE DRAWING

FIG. 1 is a table showing the operational steps performed in the practice of the present invention for fabricating a light-weight vision panel.

DESCRIPTION OF THE INVENTION

The present invention provides an improved method for the fabrication of light-weight vision panels including a sheet of acrylic material. With reference to the FIGURE, in a preferred embodiment of the invention, there are practiced seven operational steps. A billet of as-cast acrylic material, e.g., a product marketed under the trademark Plexiglass 55 by Rohm and Haas Co. of Philadelphia, Pa. meeting Military Specification MIL-P-8184B, is preheated to a first elevated temperature, e.g., about 300° F. (150° C.), for a time sufficient to create temperature uniformity throughout the billet, e.g., between about ¾ hour and about 3 hours.

After the billet is satisfactorily preheated stretching forces are applied to the billet in a controlled manner while maintaining the first elevated temperature to generate a thickness reduction in the billet, with a corresponding width and length increase. Stretching forces may be applied to the billet by pulling forces exerted upon its edge portions, as taught in U.S. Pat. No. Re.24,978 to Bottoms et al., which is incorporated herein by reference, or by pressing forces exerted upon the major surfaces of the billet, as taught in U.S. Pat. No. 3,632,841 to Fortin, which teachings are hereby incorporated by reference. In the preferred practice of the invention, stretching forces are exerted by the pressing technique of the latter reference. Pressure is applied to the billet for a time, e.g., 15 minutes, sufficient to provide a sheet of acrylic material having the desired useable thickness, and thereafter the acrylic sheet is controllably cooled from the first elevated temperature to a temperature below the softening temperature of the acrylic material, e.g., 150° F. (66° C.), before relaxing the stretching forces applied to the acrylic sheet. In this manner, the effects of "plastic memory", the internal forces within the acrylic material which tend to return it to its original configuration, are substantially avoided.

Referring to the FIGURE, it is at this stage in the procedure, after the completion of Step 3, that the conventional process would practice Step 6. As a discussion of the limitations of the conventional approach will provide the basis for a better understanding of the present invention, such will be pursued at this time. After completion of the controlled cooling of Step 3, a sheet of acrylic material is provided which generally has a class of surface deformations which are generated in the stretching step and which prove optically undesirable, e.g., surface blisters, foreign material, etc. Accordingly, the major surfaces of the acrylic sheet are commonly polished to remove the surface deformations and to provide optically smooth major surfaces. Such polishing may be practiced by reciprocating an abrasive polishing bonnet over the major surface to be polished in the presence of an aqueous silica slurry polishing compound to remove about 5 to 10 thousandths of an inch (0.0127–0.025 cm.) from the surface of the acrylic sheet.

After polishing, as in Step 6, the conventional process commonly forms a lightweight vision panel of the polished acrylic sheet, e.g., by shaping a monolithic acrylic sheet to a desired configuration, or by laminating an acrylic sheet to additional substrates, e.g., as taught in U.S. Pat. No. 4,231,827, which is incorporated by reference herein. In either case, it is common that the polished acrylic sheet is subjected to another elevated temperature condition during the formation of the vision panel. It is belived that the optical quality of the final vision panel is less than ideal because of an additional group of surface deformations which is introduced into the heretofore-optically smooth acrylic sheet by the elevated temperature conditions utilized in the vision panel formation process. It is believed that such an additional group of surface deformations are generated in the polished acrylic sheet by the relaxation of surface stresses which were introduced into the acrylic sheet during the stretching step and which tend to relax when the polished acrylic sheet is reheated during vision panel formation. The need to remove these additional surface deformations from the formed vision panel would preferably be avoided.

With renewed reference to the FIGURE, the present invention provides a method of avoiding the generation of an additional group of surface deformations in the acrylic sheet during the formation of the vision panel, by practicing Steps 4 and 5 of the invention after the controllable cooling of Step 3 and before the surface polishing of Step 6. More particularly, in the practice of the present invention, the major surfaces of the acrylic sheet are reheated to an elevated temperature which is sufficient to intentionally initiate the generation of the additional class of surface deformations, which in the prior art had been unintentionally generated during vision panel formation. As before mentioned, such additional class of surface deformations are believed to be generated by the relaxation of surface stresses in the acrylic sheet. Accordingly, in a preferred practice of the invention, the major surfaces are reheated by infrared radiant heating facilities which have limited capacity to transmit heat through the acrylic sheet, to thereby localize the heat on the major surfaces of the acrylic sheet, thus, relaxing only surface stresses, e.g., stresses existing from the surface of the sheet to a depth of between about 0.01 to 0.06 inches (0.025 to 0.15 cm.), without affecting substantially the internal stresses spaced from the surface. Preferably, the sheet is reheated in a manner which does not substantially alter its physical dimensions but which serves to initiate the generation of the additional class of surface deformations. Preferably the surface temperature is not elevated above a value at which the surface develops cracks when it is subsequently cooled to ambient temperature, e.g., less than about 270° F. (132° C.). Additionally, because it is desirable to intentionally relax the surface stresses which would otherwise be relaxed during vision panel formation, it is preferred to reheat the major surfaces of the acrylic sheet to an elevated temperature equal to or greater than the elevated temperature expected during vision panel formation, e.g., about 215° F. (102° C.).

After the major surfaces have been heated to the desired temperature, preferably locally, the acrylic sheet is preferably permitted to cool to ambient temperature, at which time it will have surface deformations resulting from both the stretching process and the relaxation of surfaces stresses. Thereafter, the polishing technique of Step 6 may be practiced to remove both classes of surface deformations.

During subsequent vision panel formation at a third elevated temperature, no significant additional surface deformations will be unintentionally generated by the surface stress relaxation mechanism, for many, if not all, such surface stresses will have been previously relaxed and the surface deformations resulting therefrom will have been removed. In this manner, an optically superior light-weight vision panel may be fabricated from an acrylic sheet.

EXAMPLE

A ¾ inch (1.9 cm.)×36 inch (91 cm.)×42 inch (107 cm.) billet of acrylic material marketed under the trademark Plexiglas 55 was press stretched into ¼ inch (0.63 cm.)×56 inch (142 cm.)×67 inch (170 cm.) flat sheet by preheating to a first elevated temperature of about 290° F. (143° C.) for about 2 hours, followed by the application of about 400 pounds per square inch (p.s.i.) ($2.76 \times 10^5$ pascal) of pressure for about 15 minutes during a stretching period at the preheat temperature, and for about 15 minutes during a controlled cooling period in which the temperature decreased to ambient temperature.

The stretched acrylic sheet was then cut into two equal ¼ inch (0.63 cm.)×28 inch (71 cm.)×67 inch (170 cm.) sheets, one of the sheets (hereinafter referred to as Sheet A) to be treated as in the conventional process and the other sheet (hereinafter referred to as Sheet B) to be treated according to the teachings of the present invention. Both Sheet A and Sheet B were lightly polished to permit an inspection, and each was then inspected for optical defects, the optical defects being categorized as either minor defects or major defects in accordance with MIL-P-25690A. Substantially equal numbers of defects were observed on each of Sheet A and Sheet B, and the defects were marked on the surface of each sheet for continued monitoring during subsequent processing steps.

Sheet B only was radiantly heat treated on both of its major surfaces for about 60 seconds from a distance of about 4 inches (10 cm.) to a surface temperature between about 240° F. (115° C.) and about 260° F. (127° C.), and thereafter cooled to ambient temperature. Both Sheet A and Sheet B were then similarly surface-polished using a reciprocating abrasive bonnet and an aqueous silica slurry polishing compound. After completion of the surface-polishing, Sheet A was again inspected for defects in accordance with MIL-P-25690A and exhibited only about 6–8 minor defects, and Sheet B was inspected and found to also exhibit about 6–8 minor defects, making each Sheet A and Sheet B optically acceptable parts according to commonly employed standards.

Thereafter, both Sheet A and Sheet B were subjected to an elevated temperature treatment intended to simulate the conditions commonly encountered during a vision panel formation process. Accordingly, each Sheet A and Sheet B were placed in an oven and heated to a temperature of about 215° F. (102° C.) for a period of about 2 hours. After cooling Sheet A and Sheet B to ambient temperature, they were again inspected for optical defects according to MIL-P-25690A. Sheet A was found to exhibit 3 major defects and 18 minor defects in addition to those defects previously marked, while Sheet B was found to exhibit no additional defects. Thus, it can be appreciated that practicing the present invention provided an acrylic sheet which retained its optically acceptable surface configuration during a simulated forming process, while failure to practice the present invention resulted in an increase in the number and severity of defects in the acrylic part which would make it unacceptable for use, thus, requiring additional corrective steps or the discarding of the fully fabricated vision panel.

Of course, the invention is not intended to be limited to the specific embodiment discussed in detail herein, as a polishing step may be practiced after both the stretching process and after the radiant reheating step. Thus, the invention is only intended to be limited by the claims which follow.

I claim:

1. In a method of producing a vision panel having a stretched acrylic sheet as a portion thereof, comprising the steps of applying stretching forces at a first elevated temperature to a blank of acrylic material to provide a sheet of a desired physical configuration, cooling said sheet to a second temperature below the softening temperature of said acrylic material, initially polishing the major surfaces of said sheet to remove surface deformations therefrom, and heating said sheet to a third elevated temperature to form said vision panel, whereby said heating step generates additional surface deformations upon said major surfaces of said sheet, the improvement comprising the steps of:

after practicing said cooling step and before practicing said heating step, increasing the temperature of at least the major surfaces of said sheet to a fourth elevated temperature sufficient to initiate the generation of said additional surface deformations without substantially altering the desired physical configuration of said sheet;

recooling said sheet to a temperature below the softening temperature of said acrylic material; and secondly polishing the major surfaces of said sheet to remove said additional surface deformations.

2. The method as set forth in claim 1, wherein said temperature increasing step is practiced to substantially localize said fourth elevated temperature to only said major surface portions of said stretched acrylic sheet.

3. The method as set forth in claim 2, wherein said temperature increasing step is practiced with radiant heating means.

4. The method as set forth in claim 1, wherein said fourth elevated temperature is greater than said third elevated temperature.

5. The method as set forth in claim 4, wherein said fourth elevated temperature is less than said first elevated temperature.

6. The method as set forth in claim 1, wherein said initially polishing step and said second polishing step are the same polishing step.

7. The method as set forth in claim 4 wherein said third elevated temperature is between about 200° F. (93° C.) and about 250° F. (121° C.), and wherein said fourth elevated temperature is between about 225° F. (107° C.) and about 270° F. (132° C.).

8. The method as set forth in claim 7, wherein said first elevated temperature is between about 275° F. (135° C.) and about 325° F. (163° C.).

* * * * *